United States Patent [19]

Goorden

[11] 4,256,471

[45] Mar. 17, 1981

[54] PROCESS FOR THE SEPARATION OF AMMONIA AND CARBON DIOXIDE FROM MIXTURES CONTAINING AMMONIA, CARBON DIOXIDE AND WATER

[75] Inventor: Josephus J. P. M. Goorden, Sittard, Netherlands

[73] Assignee: Stamicarbon, B.V., Geleen, Netherlands

[21] Appl. No.: 30,374

[22] Filed: Apr. 16, 1979

[51] Int. Cl.³ .................... B01D 53/14; B01D 19/00
[52] U.S. Cl. .......................................... 55/70; 55/48; 55/89
[58] Field of Search ............... 55/48, 68, 70, 89, 93; 423/352, 437

[56] References Cited

U.S. PATENT DOCUMENTS

| | | | |
|---|---|---|---|
| 3,225,519 | 12/1965 | Stotler | 55/48 |
| 3,910,777 | 10/1975 | Jakob | 55/68 X |
| 3,920,419 | 11/1975 | Schroeder et al. | 55/70 |
| 3,972,693 | 8/1976 | Wiesner et al. | 55/70 X |
| 4,060,591 | 11/1977 | Garber et al. | 423/352 |
| 4,093,544 | 6/1978 | Ross | 55/70 X |
| 4,120,667 | 10/1978 | Gettert et al. | 55/48 |
| 4,163,648 | 8/1979 | Biermans | 55/70 |

FOREIGN PATENT DOCUMENTS

| | | |
|---|---|---|
| 669314 | 11/1934 | Fed. Rep. of Germany . |
| 143063 | 5/1953 | Netherlands . |
| 916945 | 1/1963 | United Kingdom . |
| 1129939 | 10/1968 | United Kingdom . |

*Primary Examiner*—Robert H. Spitzer
*Attorney, Agent, or Firm*—Cushman, Darby & Cushman

[57] ABSTRACT

An improved process for the separate recovery of substantially pure ammonia and substantially pure carbon dioxide from mixtures containing ammonia and carbon dioxide, and possibly water, such as are obtained as by-products in the manufacture of melamine from urea or the synthesis of urea from ammonia and carbon dioxide. The by-product mixture is introduced into a process loop having an ammonia separation zone, a carbon dioxide separation zone and a desorption zone, the zone to which the mixture is initially fed being dependent upon its composition. The separation is effected by maintaining a system pressure differential between the ammonia and carbon dioxide separation zones, or adding diluting water to the carbon dioxide separation zone. The efficiency of the separation is enhanced by introducing a carbon dioxide containing gaseous phase, and preferably an excess of an inert gas, into the bottom of the ammonia separation zone.

16 Claims, 3 Drawing Figures

PROCESS FOR THE SEPARATION OF AMMONIA AND CARBON DIOXIDE FROM MIXTURES CONTAINING AMMONIA, CARBON DIOXIDE AND WATER

BACKGROUND OF THE INVENTION

The invention relates to an improved process for separating substantially pure ammonia and substantially pure carbon dioxide from mixtures containing ammonia, carbon dioxide and, possibly, water.

In some chemical processes mixtures containing ammonia and carbon dioxide, and sometimes also containing water, are obtained as by-products. For instance, in the synthesis of melamine from urea, a gas mixture is obtained which, in addition to melamine, also contains ammonia and carbon dioxide in amounts of at least 1.7 tons per ton of melamine. Such mixtures are also obtained in the preparation of urea from ammonia and carbon dioxide, resulting from the decomposition of by-product ammonia carbamate, and its separation from the urea product. In order to effectively utilize this ammonia and carbon dioxide after separating it from the melamine or urea, for example as recycle to a urea synthesis process, it is in most cases necessary to raise the gases to a higher pressure. Compression of such mixture requires special measures to prevent the condensation of ammonia and carbon dioxide and the deposition of solid ammonium carbamate thereby formed.

For this reason, such gas mixtures are usually absorbed in water or in an aqueous solution, which results in the formation of an ammonium carbamate solution which can be pumped to the urea synthesis reactor, sometimes being concentrated by desorption and repeated absorption at a higher pressure. A disadvantage of this procedure is that the water, recycled to the urea reactor together with the ammonia and carbon dioxide, has an unfavorable effect on the urea synthesis reaction.

It has been proposed to separately remove the ammonia and carbon dioxide from the by-product mixtures, and to separately recycle them in order to avoid the formation and deposition of ammonium carbamate. However, the binary system of ammonia and carbon dioxide forms a maximum boiling azeotrope at a molar ammonia-to-carbon dioxide ratio of about 2:1, and therefore cannot be separated by simple distillation. This phenomenon also occurs in the ternary system of ammonia, carbon dioxide and water, and the term azeotrope as used herein should be understood to include this phenomenon in the ternary system as well. Also as used herein, with respect to such binary or ternary mixture, the term "rich" with respect to ammonia shall be understood to mean that when heat is applied to a mixture 'rich' in ammonia, substantially pure gaseous ammonia escapes, until the remaining mixture has a composition on the boundary line (to be defined hereinafter). On the other hand the term 'lean' with respect to ammonia means that the mixture is not 'rich' in ammonia.

Conversely the term 'rich' with respect to carbon dioxide means that when heat is applied to a mixture 'rich' in carbon dioxide, substantially pure carbon dioxide escapes. The term 'lean' with respect to carbon dioxide means, that the mixture is not 'rich' in carbon dioxide.

Figure 1:
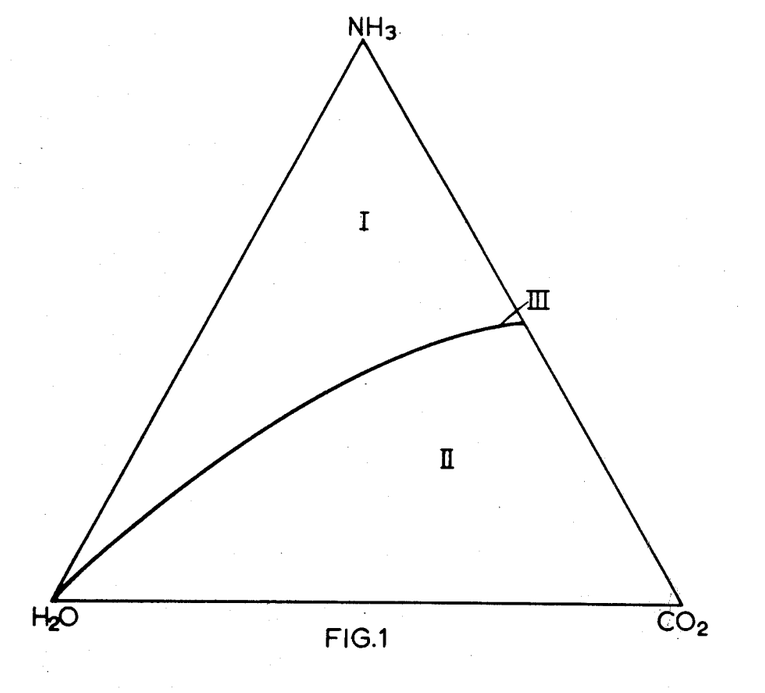
FIG. 1 shows a diagram of the $NH_3/CO_2/H_2O$ system at constant pressure, which was described in detail above.

FIG. 1 shows the ammonia-carbon dioxide-water ternary system at constant pressure in a triangular diagram. The system is divided into two areas by line III which is termed herein the "boundary line", and which represents the azeotropic composition at constant pressure at varying water concentrations. This boundary line cannot be transgressed by means of normal distilling or rectifying techniques.

Thus when a liquid mixture rich with respect to ammonia, that is, falling within the area I on FIG. 1, is rectified, gaseous ammonia escapes until the liquid composition reaches the boundary line. When a mixture rich with respect to carbon dioxide, falling within area II on FIG. 1 is rectified, gaseous carbon dioxide escapes until the liquid composition reaches the boundary line. Once the liquid mixture composition is at the boundary line, further rectification or distillation at constant pressure results in a gaseous mixture of all components, but the composition of the remaining liquid mixture does not leave the boundary line. See also, P. J. C. Kaasenbrood, Chemical Reaction Engineering, Proceedings of the Fourth European Symposium, Sept. 9–11, 1968, published by Pergamon Press (1971), pages 317–328.

Various methods have been proposed to get around this azeotrope, all of which entail the separation of the ammonia-carbon dioxide mixtures into their constituents. Separate recovery of ammonia is most important, it being the most valuable component.

Some of these processes are based on selective absorption of either the ammonia or the carbon dioxide in a liquid. The Netherlands patent application No. 143,063, for example, describes a process in which ammonia is absorbed in an aqueous solution of an ammonium salt of a strong acid, such as ammonium nitrate, at an elevated pressure. Selective absorption of carbon dioxide by washing a gas mixture with an aqueous alkanolamine solution, such as monoethanolamine is disclosed in German Pat. No. 669,314. However, all of these processes have the drawback that the absorbed component must thereafter be removed from the absorbent and purified.

It has further been proposed to separate ammonia and carbon dioxide from mixtures of ammonia, carbon dioxide and water by distilling off most of the ammonia in a first step followed by distilling off the carbon dioxide in a second step carried out at a higher system pressure. The term "system pressure" as used herein means the sum of the partial pressures of ammonia, carbon dioxide and water. Processes of this kind are described in U.S. Pat. Nos. 3,112,177 and 4,060,591 and in British Pat. Nos. 916,945 and 1,129,939.

U.S. Pat. No. 3,112,177 describes a process in which in a first step carried out at a system pressure of between 1 and 5 atmospheres absolute, carbon dioxide gas is separated from a mixture of ammonia, carbon dioxide and water, which mixture is lean with respect to ammonia. The remaining liquid is then stripped with, for instance, methane at an overall pressure of 1 atmosphere absolute. This results in a lowering of the system pressure and in the escape of ammonia and some carbon dioxide, so that a mixture of methane, ammonia and carbon dioxide with an overall pressure of 1 atmosphere absolute is obtained. In order to remove traces of carbon dioxide contained in the gas mixture, part of the mixture is condensed, causing the carbon dioxide to be absorbed by the liquid ammonia.

U.S. Pat. No. 4,060,591 discloses a process for recovering ammonia from aqueous mixtures also containing $CO_2$ and $H_2O$ wherein the mixture is first deacidified by stripped out $CO_2$ at an elevated pressure. The remaining liquid is then stripped of all $NH_3$, $CO_2$ and $H_2O$, and the resulting gas mixture is scrubbed or stripped at a reduced pressure, relative to the deacidifcation step, to yield a gas stream of pure ammonia.

A similar process is described in British Pat. No. 916,945 wherein an ammoniacal liquor is deacidified at an elevated pressure in a column wherein the ascending gas is washed of ammonia by cold water, thereby yielding gaseous carbon dioxide. The remaining liquid is thereafter expanded into a stripper wherein it is freed of all ammonia and carbon dioxide. The resulting gaseous mixture is washed or scrubbed with all or a portion of the ammoniacal liquor feed, before the latter is deacidified, yielding a substantially pure ammonia stream.

In British Pat. No. 1,129,939, a gas mixture consisting of ammonia and carbon dioxide, rich with respect to ammonia, is absorbed in water or an aqueous solution. Ammonia is distilled from the resulting aqueous solution at atmospheric pressure. The remainder of the solution is then subjected to fractional distillation at a pressure of between 5 and 20 atmospheres absolute with heating in order to remove the carbon dioxide.

These latter processes are based on the principle that changing the pressure of a system of ammonia, carbon dioxide and water makes it possible to separate out ammonia at the lower pressure and carbon dioxide at the higher pressure. In these "pressure differential" processes the system pressure in the carbon dioxide separation zone should be at least twice that in the ammonia separation zone. Preferably the ratio between the system pressures in the ammonia separation and the the carbon dioxide separation zones should be between about 1:5 and 1:20, if the separation is to proceed smoothly.

However, the pressure differential processes have the drawback that if the ammonia and carbon dioxide mixture is available at a pressure of more than 1 atmosphere, it first has to be expanded to 1 atmosphere. Gaseous ammonia is then released having a maximum pressure of 1 atmosphere, or even lower in the event a large amount of another gas is present. If this ammonia is to be subjected to further processing, such as in a urea synthesis process, it has to be raised to a higher pressure. The compression energy required for this is quite substantial. Furthermore, the carbon dioxide concentration in the ammonia has to be kept extremely low in order to avoid the formation and deposition of solid ammonium carbamate in the compressor and high pressure lines.

An alternate process not requiring this pressure differential is disclosed and claimed in Biermans U.S. Pat. No. 4,163,648, the entire disclosure of which is hereby incorporated by reference herein. The process therein described permits the recovery of ammonia and carbon dioxide separately from such mixtures, without the need for such a pressure differential, if the ammonia and carbon dioxide containing feed supplied to a carbon dioxide separation zone is diluted by the addition of water in an amount of between 0.2 and 6 times, by weight, the total weight of such ammonia and carbon dioxide containing feed. For simplicity this latter process will be referred to herein as a "dilution process."

According to one embodiment of the dilution process, ammonia substantially free of carbon dioxide and water is first separated from a mixture of ammonia, carbon dioxide and possibly water, rich with respect to ammonia, in an ammonia separation zone. From the residual liquid phase leaving the bottom of this ammonia separation zone, carbon dioxide is separated in the carbon dioxide separation zone, wherein the residual liquid phase from the ammonia separation zone fed to the carbon dioxide separation zone is diluted with between 0.2 and 6 times its weight of water.

According to another embodiment of the dilution process, carbon dioxide substantially free of ammonia and water is first separated in a carbon dioxide separation zone from a mixture of ammonia, carbon dioxide and possibly water, which mixture is lean with respect to ammonia. From the bottom of this carbon dioxide separation zone, the residual liquid phase is fed to a desorption zone wherein virtually all ammonia and carbon dioxide are desorbed and the resulting gas phase is introduced into the ammonia separation zone. Ammonia, substantially free of carbon dioxide and water, is recovered from this resulting gas phase in the ammonia separation zone, and the resulting liquid phase is supplied to the carbon dioxide separation zone. Diluting water is added to this carbon dioxide separation zone in an amount of between 0.2 and 6 times, by weight, the combined total weight of the initial mixture to be separated, plus the residual liquid phase from the ammonia separation zone fed into the carbon dioxide separation zone.

According to another embodiment of the dilution process, where the ammonia and carbon dioxide containing mixture to be separated also contains a substantial quantity of water, it may be advantageous to feed this mixture initially to the desorption zone wherein the ammonia and carbon dioxide are desorbed, and, together with some water vapor, are introduced into the ammonia separation zone. Ammonia, substantially free of carbon dioxide and water vapor, is obtained from the top of the ammonia separation zone, and the residual liquid phase, containing ammonia, carbon dioxide and water, is introduced into the carbon dioxide separation zone. Diluting water is also introduced into the carbon dioxide separation zone in an amount of between about 0.2 to 6 times, by weight, the total quantity of the residual liquid phase from the ammonia separation zone fed into the carbon dioxide separation zone. Carbon dioxide, substantially free of ammonia and water, is obtained from the top of the carbon dioxide separation zone, and the residual liquid phase from the bottom of the carbon dioxide separation zone is fed to the desorption zone.

SUMMARY OF THE INVENTION

In both the pressure differential and dilution processes, the composition of the residual liquid phase from the bottom of the ammonia separation zone should reach or closely approximate the boundary line, or azeotropic composition under the prevailing conditions, in order to maximize the efficiency of the separation. This means that the amount of ammonia still present in the liquid phase is considerable, which is undesirable with respect to energy consumption. This ammonia negatively influences the effectiveness of the separation in the carbon dioxide separation zone to which it is fed, which in turn requires a substantial amount of extra energy in the desorption zone.

It is therefore an object of the present invention to provide an improved process for the separation of substantially pure ammonia and substantially pure carbon dioxide from mixtures thereof with water, which process permits significant savings in energy.

It has been found, in accordance with the present invention, that the efficiency and effectiveness of the separation can be enhanced by introducing into the bottom portion of the $NH_3$-separation zone a carbon dioxide containing gaseous phase in an amount sufficient to make the residual liquid phase removed therefrom lean with respect to ammonia. Referring to FIG. 1, sufficient carbon dioxide should be introduced to move the composition of the residual liquid phase removed from the ammonia separation zone from area I to a composition lying on the boundary line or in area II.

The amount of carbon dioxide required to achieve this objective ranges generally between about 0.01 and 0.2, preferably between about 0.02 and 0.1 times by weight the amount of residual liquid phase removed from the ammonia separation zone, which liquid phase is thereafter fed into the carbon dioxide separation zone. The total amount of such carbon dioxide containing gaseous phase introduced into the bottom of the ammonia separation zone depends, among other factors, upon the desired effect. However the amount of carbon dioxide that can be introduced has an upper limit defined by the point at which solid ammonium carbamate or other solid compounds begin to deposit in the columns and lines, which will occur if too much carbon dioxide is used.

When carried out in conjunction with the method of this invention, the energy consumption of the known separation processes becomes clearly lower, and the effectiveness and efficiency of the separation becomes virtually insensitive to fluctuations in the composition of the feed to the ammonia separation zone. Furthermore, this improved process can result in a decrease in the quantity of the liquid flows which have to be recycled throughout the various zones of the separation.

Preferably this carbon dioxide containing gas phase is obtained by using a part of the carbon dioxide off-gas from the carbon dioxide separation zone. However, use can be made of a gas mixture containing carbon dioxide and ammonia. In such case it is necessary that the carbon dioxide to ammonia ratio in such a gas mixture be greater than the carbon dioxide to ammonia ratio of the gas in equilibrium with the residual liquid phase obtained from the bottom of the ammonia separation zone. Otherwise, it will not be possible to transgress the boundary line.

In a preferred embodiment of the invention, the carbon dioxide containing gaseous phase contains, in addition to the carbon dioxide, an amount of an inert gas, preferably air or nitrogen. The weight ratio of carbon dioxide to inert gas is preferably in the range of between 30:70 and 70:30.

Introducing an inert gas in an amount greater than normally introduced with gases used to passivate the stainless steel materials offers the advantage that the presence of such inert gas tends to reduce the amount of ammonia remaining in the residual liquid phase removed from the ammonia separation zone. As noted above, this results in an advantageous reduction in energy consumption, especially in the desorption step.

A further advantage of the presence of additional amounts of inert gas is that the bottom temperature of the ammonia column is lowered, thus permitting a more economic use of the heat content of the various liquid and gas streams obtained during the separations.

A third advantage is that the gas to liquid ratio is more favorable, with the consequence that the separation efficiency is improved. With such an improved separation efficency, either the total amount of mixture that is separated can be increased, or the column used for the separations can be reduced in size. Moreover, the dependence of the energy consumption required for the separations on the exact composition of the liquid phase removed from the bottom of the ammonia separation zone is greatly reduced.

Preferably the pressures in the various separation zones should be between about 50 and 5000 kPa. A pressure of about 1800 kPa or more, depending upon the temperature of the available cooling water, as referred to hereinafter, in the ammonia separation zone offers the advantage that the separated ammonia can be liquified relatively easily and inexpensively by cooling with cooling water. In the dilution type process, the system pressure in the carbon dioxide separation zone can be the same as in the ammonia separation zone, but can be higher as well. Preferably, however, the system pressure in the carbon dioxide separation zone will not be greater than twice the system pressure in the ammonia separation zone.

The temperatures maintained in the various separation zones depend on the pressures, the composition of the feed and the purity required of the products to be separated. In the dilution process, these temperatures, where rectifying columns are used in the separation zones, generally range within the limits stated in the following table:

| | bottom | top |
|---|---|---|
| $NH_3$-separation | +60 to +170° C. | −35 to +66° C. |
| $CO_2$-separation | +75 to +200° C. | 0 to +100° C. |

The temperatures in the desorption zone are also determined by the pressures, the composition of the feed to the zone and the purity requirements (amount of ammonia and carbon dioxide) for the desorption water removed from the bottom of this zone. Generally these temperatures are chosen to be higher than the boiling point of the liquid phase to be desorbed at the pressures used.

When using the process of this invention in conjunction with a pressure differential type of process, the system pressure in the carbon dioxide separation zone should be at least twice the system pressure in the ammonia separation zone. However, for the separation to proceed smoothly it is preferable that the ratio of the system pressure in the carbon dioxide separation zone to the system pressure in the ammonia separation zone be within the range of between about 1:5 and 1:20. The temperatures maintained in the various separation zones again depend upon the pressure chosen, the composition of the feed and the purity required of the products to be separated.

It may also be of some advantage, when using a pressure differential type of process, to feed some diluting water into the carbon dioxide separation zone to assist in the separation. In such case the amount of diluting water added depends upon many factors including the pressure differential used between the carbon dioxide and ammonia separation zones, and the composition of the various feeds.

The choice to which separation step the mixture to be separated is initially fed depends i.a. upon the composition of this mixture. Thus, if it is rich with respect to ammonia, (in area I on FIG. 1), then it is most advantageously fed to the ammonia separation step. On the other hand, if it is lean with respect to ammonia, (on boundary line III or within area II on FIG. 1), then it is most advantageously fed initially to the carbon dioxide separation step. Finally, if the mixture to be separated is rich with respect to ammonia and also contains a substantial quantity of water, it may be most advantageous to feed it initially to the desorption step.

The ammonia and carbon dioxide zones may consist of any type of apparatus suitable for separating the gaseous and liquid components in accordance with the invention including, but not limited to, rectification, distillation and washing columns. However, rectification columns, or columns having rectification zones, are most suitable for use in the improved process of this invention.

Some variations may be made in the flows between the various separation zones of the separation process to which the present process is applied, and still be within the scope and intent of this invention.

DETAILED DESCRIPTION OF THE PREFERRED EMBODIMENTS

Figure 2:
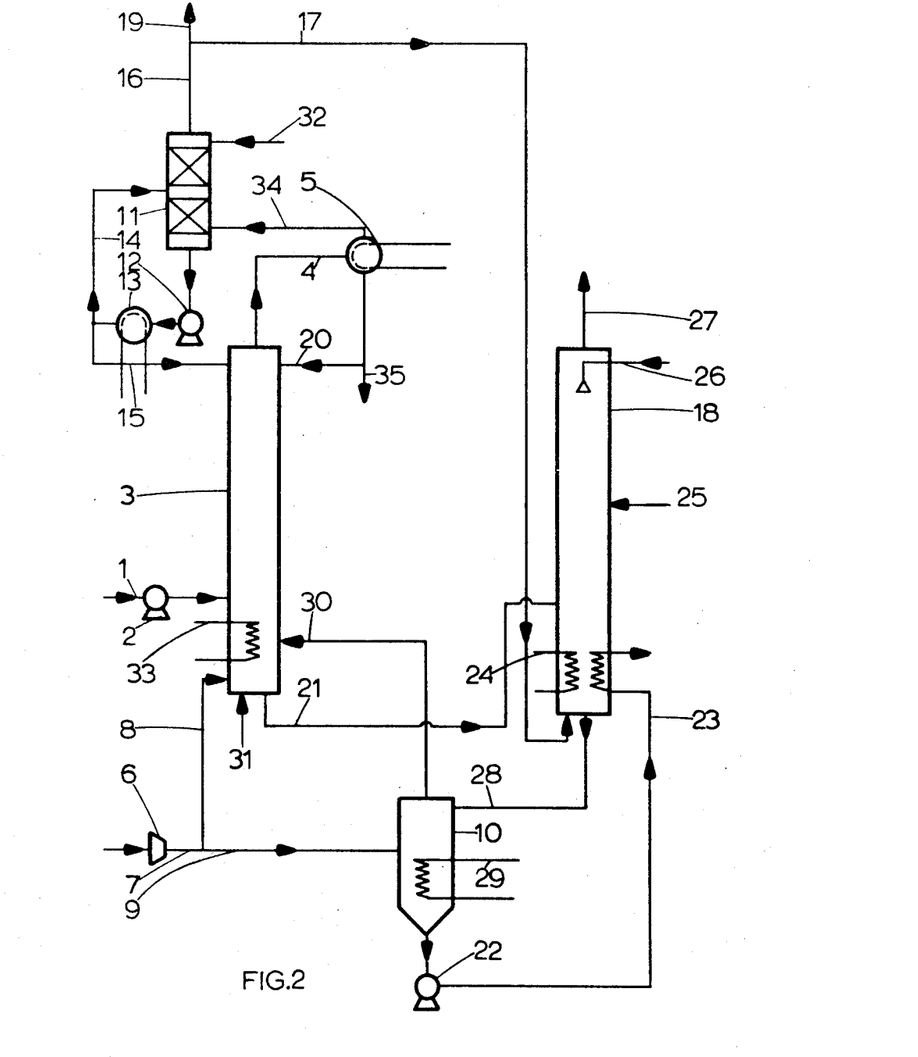
FIG. 2 shows a diagram for the process according to the invention used in conjunction with a dilution process in which the $NH_3$ and the $CO_2$ separation zones are operated at almost the same pressure.

One preferred embodiment of this invention is illustrated in FIG. 2 wherein the carbon dioxide addition is applied to a dilution process in which the ammonia and carbon dioxide separation zones are operated at substantially the same pressure. In this FIG. 2, the ammonia separation zone is comprised of $NH_3$-rectifying column 3, the carbon dioxide separation zone of $CO_2$-rectifying column 18 and the desorption zone of desorber 10.

A mixture of $NH_3$, $CO_2$ and $H_2O$ is fed to an $NH_3$-rectifying column 3 through conduit 1 and pump 2. Heat is supplied through heating coil 33. Through conduit 31, a $CO_2$ containing gas is introduced into the bottom of the $NH_3$ rectifying column 3. $NH_3$ is discharged from the top of column 3 through conduit 4. This $NH_3$ can be condensed by (deep-) cooling in condenser 5. A non-condensed gaseous mixture of $NH_3$ and inert gas escapes from the condenser. This inert gas comes from the air introduced into the installation to passivate the structural materials used in vessels and conduits in order to reduce corrosion to an acceptable level. Naturally, oxygen or an oxygen-releasing substance may be used for this purpose instead of air. In one embodiment of the invention the amount of air introduced is far in excess of the amount necessary to keep the materials in a passivated state. In this embodiment the air helps to improve the efficiency of the separation. Part of the air is fed to the $NH_3$-rectifying column 3 through compressor 6 and conduits 7 and 8 and part to desorber 10 through conduit 9. The gaseous mixture from condenser 5 is fed through line 34 to scrubber 11, where it is freed of $NH_3$ by washing it with water supplied through conduit 32, while an amount of absorption heat is removed by cooling part of the resulting aqueous $NH_3$ solution that is discharged through pump 12 in a recycle cooler 13 and returning it to scrubber 11 through conduit 14. The solution then formed is returned to $NH_3$-rectifying column 3 through conduit 15.

The inert gas is discharged through conduit 16 and fed to the bottom of $CO_2$-rectifying column 18 through conduit 17. If so desired, it may also be vented completely or partly through conduit 19. Part of the $NH_3$ liquified in condenser 5 flows back through conduit 20 to the $NH_3$-rectifying column to be used as reflux. The remainder is discharged through line 35. A solution of $NH_3$ and $CO_2$ in water is discharged from the bottom of the $NH_3$-rectifying column 3 through conduit 21.

This solution is passed into the $CO_2$-rectifying column 18, which is operated at virtually the same pressure as the $NH_3$-rectifying column 3. An amount of diluting water is introduced into column 18 by way of line 25. The bottom product of desorber 10 is removed by way of pump 22 and conduit 23. In order to obtain a better heat distribution, this desorption water is first allowed to give off part of its heat in the bottom of the $CO_2$-rectifying column 18. The remainder of the heat required for the rectification is supplied here by means of heating coils 24 and, for instance, steam. The liquid flow from conduit 23 is discharged, although part of it can be used as diluting water. An additional amount of washing water is fed to column 18 through conduit 26 to remove the $NH_3$ as completely as possible from the $CO_2$. A gas consisting of $CO_2$ and inert gas, if any, essentially free of $NH_3$, escapes from the top of column 18 through conduit 27. The bottom product, or residual liquid phase, of column 18, which is a diluted solution of $NH_3$ and $CO_2$ in water, is passed through conduit 28 to desorber 10. Virtually all $NH_3$ and $CO_2$ are removed in desorber 10 by heating, for instance with steam in heating coils 29. The resulting desorption water is virtually free of $NH_3$ and $CO_2$ and is discharged through conduit 23. The gaseous mixture of $NH_3$, $CO_2$ and $H_2O$ formed in desorber 10 flows to $NH_3$-rectifying column 3 through conduit 30. In the above embodiment of the process according to the invention, use was made of a mixture of $NH_3$, $CO_2$ and $H_2O$, having a composition lying in the area rich in $NH_3$. If the composition of this starting mixture was lean with respect to $NH_3$, then the feed stream would have been initially introduced into $CO_2$ rectifying column 18.

Figure 3:
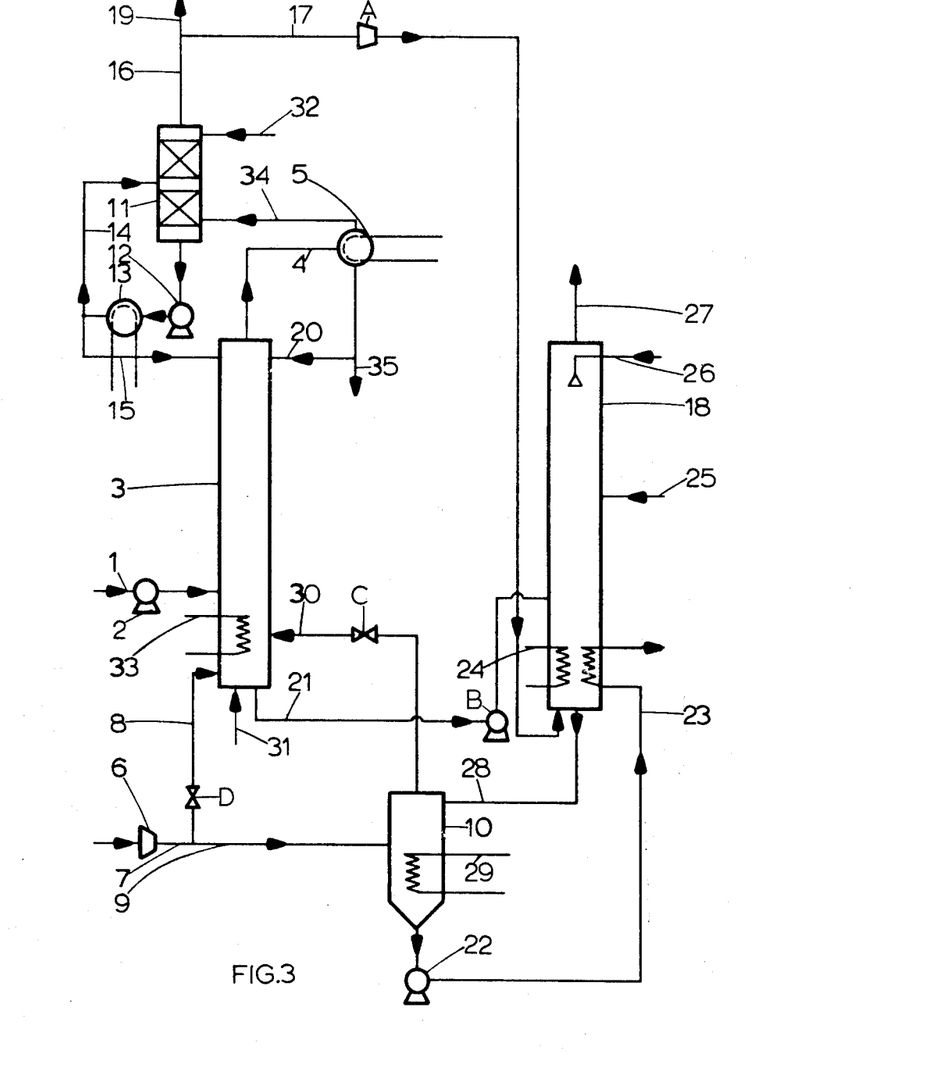
FIG. 3 shows a diagram of a similar process in which the separations are effected at different pressures.

Another preferred embodiment of the invention is illustrated in FIG. 3 wherein the $CO_2$ rectification is effected at a pressure higher than the $NH_3$ rectification.

This figure is virtually the same as FIG. 2, and the reference figures have the same meaning. The differences lie in the fact that a compressor A and a pump B, respectively, are installed in conduits 17 and 21 to raise the pressure of the flows of gas and liquid, respectively. Furthermore, conduit 30 comprises a reducing valve C through which part of the gaseous mixture from desorber 10 is reduced in pressure. Here the desorption column 10 is operated at virtually the same system pressure as the $CO_2$ rectification. Conduit 18 moreover comprises a reducing valve D which is used to lower the pressure of part of the air fed in.

A third embodiment of the invention utilizing the pressure differential process can also be effected in the apparatus illustrated in FIG. 3. In such cases the pressure at which the $CO_2$-separation is effected is at least 2 times, but preferably 5 times as high as the pressure at which the $NH_3$-separation is effected. In this case no diluant need to be added to the $CO_2$-separation zone as is the case in the dilution type process.

The invention will be further described by means of the following examples, which are for illustrative purposes only, and the scope of the invention is not restricted thereto.

EXAMPLE 1

Substantially pure $NH_3$ and substantially pure $CO_2$ were separated from a mixture of $NH_3$, $CO_2$ and $H_2O$ in an installation having a configuration as shown in FIG. 3.

The reference figures relate to FIG. 3 as described above in relation to FIG. 2 and percentages are percentages by weight. The pressures mentioned relate to the $NH_3/CO_2/H_2O$ system pressure. The actual pressure may be slightly higher owing to the presence of inert gas.

At a pressure of 1800 kPa 56489 kg/h of a solution of $NH_3$ and $CO_2$ in water, the composition of which is 32.8% $NH_3$, 18.3% $CO_2$ and 48.9% water, are added to the $NH_3$-rectifying column 3. 635 kg/h of air are added by way of compressor 6, 248 kg/h being introduced into the $NH_3$-rectifying column 3 and 387 kg/h into desorber 10. By way of line 31, 2000 kg/h of $CO_2$ are introduced in the $NH_3$-rectifying column 3. 27,026 kg/h of a gaseous mixture consisting of 58.2% $NH_3$, 14.1% $CO_2$ 27.7% $H_2O$ and 1.5% inert gas from desorber 10 are expanded through valve C and also added to the $NH_3$-rectifying column 3. 38,180 kg/h of gaseous mixture consisting of 98.0% $NH_3$, 0.3% $H_2O$ and 1.7% inert gas are discharged from the top of this column 3. Part of this gaseous mixture is liquified by cooling in condensor 5, from which 17,824 kg/h of liquid $NH_3$ are returned to column 3 as a reflux, and 18,528 kg/h of liquid $NH_3$ are discharged. 2,464 kg/h of gaseous mixture consisting of 74.2% $NH_3$ and 25.8% of inert gas escape from condensor 5. This mixture is washed in scrubber 11 with 2200 kg/h of water. Heat is removed from scrubber 11 via recycle condensor 13. Per hour, 4029 kg of a solution consisting of 45.4% $NH_3$ and 54.6% $H_2O$ are returned to the $NH_3$-rectifying column. 635 kg/h of inert gas are passed through conduits 16 and 17 and compressor A to the $CO_2$-rectifying column 18.

69,180 kg/h of a liquid having a composition of 22.7% $NH_3$, 23.4% $CO_2$ and 53.9% $H_2O$ are passed from the bottom of the $NH_3$-rectifying column 3 through conduit 21 and pump B to the $CO_2$-rectifying column 18. Column 18 is fed, through conduit 25, and through conduit 26 with 34,079 kg/h of water.

A gaseous mixture of 12,337 kg/h escapes from the top of $CO_2$-rectifying column 18 and consists, inter alia, of 93.2% $CO_2$ and contains less than 100 ppm $NH_3$. 90,913 kg/h of a solution 78.5% $H_2O$, 17.3% $NH_3$ and 4.2% $CO_2$ are passed from the bottom of the column 18 to desorber 10. The composition of this liquid is on the side of the boundary line that is rich in $CO_2$.

In the desorber the solution is virtually freed of $NH_3$ and $CO_2$ by means of steam. A total of 63,892 kg/h of liquid are discharged from the desorber, which liquid may be used, for instance, for the absorption of $NH_3$ and $CO_2$, or, partly, as diluting water in the $CO_2$-separation zone.

EXAMPLE 2

Substantially pure $NH_3$ and substantially pure $CO_2$ were separated from a mixture of $NH_3$, $CO_2$ and $H_2O$ in an installation having the configuration of FIG. 3, wherein $CO_2$ as well as air were introduced in the $NH_3$-rectifying column. The reference figures relate to FIG. 3 and percentages are percentages by weight.

At a pressure of 1800 kPa, 51,972 kg/h of a solution of $NH_3$ and $CO_2$ in water, having a composition of 33.4% $NH_3$, 18.2% $CO_2$ and 48.4% water, are added to the $NH_3$-rectifying column 3. 2,387 kg/h of air are introduced into the process by way of compressor 6, 2000 kg/h being fed to the $NH_3$-rectifying column 3 and 387 kg/h to desorber 10. By way of line 31, 2000 kg/h of $CO_2$ are introduced in the $NH_3$-rectifying column 3.

22,928 kg/h of a gaseous mixture consisting of 57.7% $NH_3$, 16.0% $CO_2$, 26.3% $H_2O$ and 1.5% inert gas from desorber 10 are expanded through valve C and also introduced into $NH_3$-rectifying column 3. 32,415 kg/h of a gaseous mixture consisting of 98.0% $NH_3$, 0.3% $H_2O$ and 1.7% inert gas are discharged from the top of this column. Part of this gaseous mixture is liquified by cooling in condenser 5, from which 15,057 kg/h of liquid ammonia are returned to column 3 as a reflux and 17,358 kg/h of liquid $NH_3$ are discharged. 9,252 kg/h of the residual non-condensed gaseous mixture, consisting of 74.2% $NH_3$ and 25.8% inert gas, escape from condenser 5. This residual mixture is washed in scrubber 11 via recycle condenser 13. Per hour, 3,829 kg of a solution consisting of 82.0% $NH_3$ and 18.0 of $H_2O$ are returned to the $NH_3$-rectifying column. 635 kg/h of inert gas are passed through conduits 17 and compressor A to the $CO_2$-rectifying column 18.

62,042 kg/h of a residual liquid phase having a composition of 22.3% $NH_3$, 24.6% $CO_2$ and 53.1% $H_2O$ are passed from the bottom of the $NH_3$-rectifying column 3 through conduit 21 and pump B to $CO_2$-rectifying column 18.

Column 18 is also fed, through conduit 25, and through conduit 26, with 20,486 kg/h of water. A gaseous mixture of 11,482 kg/h escapes from the top of $CO_2$-rectifying column 18, and consists, inter alia, of 93.2% $CO_2$ and contains less than 100 ppm $NH_3$. 79,817 kg/h of a solution of 77.9% $H_2O$, 17.3% $NH_3$ and 4.8% $CO_2$ are passed from the bottom of column 18 to desorber 10. The composition of this liquid is on the side of the boundary line that is rich in $CO_2$.

A total of 55,889 kg/h of liquid are discharged from the desorber, which liquid may be used, for instance, for the absorption of $NH_3$ and $CO_2$, or partly, as diluting water in the $CO_2$-separation zone. In this desorber the solution is virtually freed of $NH_3$ and $CO_2$ by means of steam.

EXAMPLE 3

Substantially pure $NH_3$ and $CO_2$ were separated from mixtures thereof using a process as described in FIG. 3, but wherein the transgression of the boundary line was not effected by the addition of water to the $CO_2$ column, but rather by a pressure differential between the ammonia separation zone and the carbon dioxide separation zone. Thus, the $NH_3$ column was operated at a pressure of between 100 and 500 kPa and the $CO_2$ column was operated at a pressure between 1500 and 3000 kPa.

Results comparable to those of the above examples were obtained in this way.

EXAMPLES 4, 5 AND COMPARATIVE EXAMPLE 6

Examples 4 and 5 were carried out substantially the same as Examples 1 and 2, and the amount of energy necessary was determined. This amount of energy was compared with a process (Example 6) wherein no $CO_2$, and only an amount of air necessary to keep the materials in a passivated state, were added to the CO₂ column. Taking the energy consumption of Example 6 as 100%, the results were as follows:

| Example | Relative amount of energy |
|---------|---------------------------|
| 4       | 90%                       |
| 5       | 85%                       |
| 6       | 100%                      |

What is claimed is:

1. An improved process for the separate recovery of ammonia substantially free of carbon dioxide and water, and carbon dioxide substantially free of ammonia and water, from a mixture essentially containing ammonia and carbon dioxide, in which process:

an ammonia off-gas substantially free of carbon dioxide and water is separated by rectification in an ammonia separation zone, and the resulting residual liquid phase containing ammonia, carbon dioxide and water is removed therefrom and introduced into a carbon dioxide separation zone;

a carbon dioxide off-gas substantially free of ammonia and water is separated by rectification in a carbon dioxide separation zone and the resulting residual liquid phase containing ammonia, carbon dioxide and water is removed therefrom and introduced into a desorption zone; and an off-gas containing ammonia, carbon dioxide and water vapor is separated from a liquid phase of desorption water substantially free of ammonia and carbon dioxide, and at least a portion of said off-gas is introduced into said ammonia separation zone;

said improvement comprising introducing into the portion of said ammonia separation zone from which said residual liquid phase is removed, a carbon dioxide containing gaseous phase in an amount sufficient to make the residual liquid phase removed therefrom lean with respect to ammonia.

2. The process of claim 1 wherein a portion of the carbon dioxide off-gas from the carbon dioxide separation zone is used as said carbon dioxide containing gaseous phase introduced into said ammonia separation zone.

3. The process of claim 1 wherein the amount of carbon dioxide introduced into said gaseous phase ranges between about 0.2 and 0.01 times by weight the amount of residual liquid phase removed from the ammonia separation zone.

4. The process of claim 3 wherein said amount of carbon dioxide ranges between about 0.1 and 0.02 by weight the amount of said liquid phase.

5. The process of claim 1 wherein an amount of inert gas is also introduced into the portion of the ammonia separation zone from which said residual liquid phase is removed.

6. The process of claim 5 wherein the weight ratio of said carbon dioxide containing gaseous phase to said inert gas is within the range of between 30:70 and 70:30.

7. An improved process for the separate recovery of ammonia substantially free of carbon dioxide and water, and carbon dioxide substantially free of ammonia and water, from a mixture essentially containing ammonia and carbon dioxide, which mixture is rich with respect to ammonia, said process comprising the steps of:

introducing said mixture into an ammonia separation zone and separately removing therefrom an ammonia off-gas substantially free of carbon dioxide and water, and a residual liquid phase containing ammonia, carbon dioxide and water;

introducing said residual liquid phase from said ammonia separation zone into a carbon dioxide separation zone and separately removing therefrom a carbon dioxide off-gas substantially free of ammonia and water, and a residual liquid phase containing ammonia, carbon dioxide and water;

introducing said residual liquid phase from said carbon dioxide separation zone into a desorption zone and separately removing therefrom a desorption zone off-gas containing ammonia, carbon dioxide and water vapor, and a liquid phase of desorption water substantially free of ammonia and carbon dioxide; and introducing at least a portion of said desorption zone off-gas into said ammonia separation zone;

wherein diluting water is introduced into said carbon dioxide separation zone in an amount of between about 0.2 and 6 times, by weight, the total weight of said residual liquid phase from said ammonia separation zone introduced into said carbon dioxide separation zone, said improvement comprising introducing into the portion of said ammonia separation zone from which said said residual liquid phase is removed, a carbon dioxide containing gaseous phase is an amount sufficient to make said residual liquid phase removed therefrom lean with respect to ammonia.

8. An improved process for the separate recovery of ammonia substantially free of carbon dioxide and water, and carbon dioxide substantially free of ammonia and water, from a mixture essentially containing ammonia and carbon dioxide, which mixture is lean with respect to ammonia, said process comprising the steps of:

introducing said mixture into a carbon dioxide separation zone and separately removing therefrom a carbon dioxide off-gas substantially free of ammonia and water, and a residual liquid phase containing ammonia, carbon dioxide and water;

introducing said residual liquid phase from said carbon dioxide separation zone into a desorption zone and separately removing therefrom a desorption zone off-gas containing ammonia, carbon dioxide and water vapor, and a liquid phase of desorption water substantially free of ammonia and carbon dioxide;

introducing at least a portion of said desorption zone off-gas into an ammonia separation zone and separately removing therefrom an ammonia off-gas substantially free of carbon dioxide and water, and a residual liquid phase containing ammonia, carbon dioxide and water; and introducing said residual liquid phase from said ammonia separation zone into said carbon dioxide separation zone;

wherein diluting water is introduced into said carbon dioxide separation zone in an amount of between about 0.2 and 6 times, by weight, the combined total weight of said mixture and said residual liquid phase from said mixture and said residual liquid phase from said ammonia separation zone introduced into said carbon dioxide separation zone, said improvement comprising introducing into the portion of said ammonia separation zone from which said residual liquid phase is removed, a carbon dioxide containing gaseous phase in an amount sufficient to make said residual liquid phase removed therefrom lean with respect to ammonia.

9. An improved process for the separate recovery of ammonia substantially free of carbon dioxide and water, and carbon dioxide substantially free of ammonia and water, from a mixture essentially containing ammonia and carbon dioxide, which mixture is rich with respect to ammonia and additionally contains a substantial amount of water, said process comprising the steps of:
 introducing said mixture into a desorption zone and separately removing therefrom a desorption zone off-gas containing ammonia, carbon dioxide and water vapor, and a liquid phase of desorption water substantially free of ammonia and carbon dioxide;
 introducing at least a portion of said desorption zone off-gas into an ammonia separation zone and separately removing therefrom an ammonia off-gas substantially free of carbon dioxide and water, and a residual liquid phase containing ammonia, carbon dioxide and water;
 introducing said residual liquid phase from said ammonia separation zone into a carbon dioxide separation zone and separately removing therefrom a carbon dioxide off-gas substantially free of ammonia and water and a residual liquid phase containing ammonia, carbon dioxide and water; and
 introducing said residual liquid phase from said carbon dioxide separation zone into said desorption zone;
wherein diluting water is introduced into said carbon dioxide separation zone in an amount of between about 0.2 and 6 times, by weight, the total weight of said residual liquid phase from said ammonia separation zone introduced into said carbon dioxide separation zone, said improvement comprising introducing into the portion of said ammonia separation zone from which said residual liquid phase is removed, a carbon dioxide containing gaseous phase in an amount sufficient to make said residual liquid phase removed therefrom lean with respect to ammonia.

10. The process of claims 7, 8 or 9 wherein the system pressure in said carbon dioxide separation zone is no greater than twice the system pressure in said ammonia separation zone.

11. The process of claim 10 wherein the system pressure in said carbon dioxide separation zone is substantially the same as the system pressure in said ammonia separation zone.

12. An improved process for the separate recovery of ammonia substantially free of carbon dioxide and water, and carbon dioxide substantially free of ammonia and water, from a mixture essentially containing ammonia and carbon dioxide, which mixture is rich with respect to ammonia, said process comprising the steps of:
 introducing said mixture into an ammonia separation zone and separately removing therefrom an ammonia off-gas substantially free of carbon dioxide and water, and a residual liquid phase containing ammonia, carbon dioxide and water;
 introducing said residual liquid phase from said ammonia separation zone into a carbon dioxide separation zone and separately removing therefrom a carbon dioxide off-gas substantially free of ammonia and water, and a residual liquid phase containing ammonia, carbon dioxide and water;
 introducing said residual liquid phase from said carbon dioxide separation zone into a desorption zone and separately removing therefrom a desorption zone off-gas containing ammonia, carbon dioxide and water vapor, and a liquid phase of desorption water substantially free of ammonia and carbon dioxide; and
 introducing at least a portion of said desorption zone off-gas into said ammonia separation zone;
wherein the system pressure in said carbon dioxide separation zone is greater than twice the system pressure in said ammonia separation zone, said improvement comprising introducing into the portion of said ammonia separation zone from which said residual liquid phase is removed, a carbon dioxide containing gaseous phase in an amount sufficient to make said residual liquid phase removed therefrom lean with respect to ammonia.

13. An improved process for the separate recovery of ammonia substantially free of carbon dioxide and water, and carbon dioxide substantially free of ammonia and water, from a mixture essentially containing ammonia and carbon dioxide, which mixture is lean with respect to ammonia, said process comprising the steps of:
 introducing said mixture into a carbon dioxide separation zone and separately removing therefrom a carbon dioxide off-gas substantially free of ammonia and water, and a residual liquid phase containing ammonia, carbon dioxide and water;
 introducing said residual liquid phase from said carbon dioxide separation zone into a depression zone and separately removing therefrom a desorption zone off-gas containing ammonia, carbon dioxide and water vapor, and a liquid phase of desorption water substantially free of ammonia and carbon dioxide;
 introducing at least a portion of said desorption zone off-gas into an ammonia separation zone and separately removing therefrom an ammonia off-gas substantially free of carbon dioxide and water, and a residual liquid phase containing ammonia, carbon dioxide and water; and
 introducing said residual liquid phase from said ammonia separation zone into said carbon dioxide separation zone;
wherein the system pressure in said carbon dioxide separation zone is greater than twice the system pressure in said ammonia separation zone, said improvement comprising introducing into the portion of said ammonia separation zone from which said residual liquid phase is removed, a carbon dioxide containing gaseous phase in an amount sufficient to make said residual liquid phase removed therefrom lean with respect to ammonia.

14. An improved process for the separate recovery of ammonia substantially free of carbon dioxide and water, and carbon dioxide substantially free of ammonia and water, from a mixture essentially containing ammonia and carbon dioxide, which mixture is rich with respect to ammonia and additionally contains a substantial amount of water, said process comprising the steps of:
 introducing said mixture into a desorption zone and separately removing therefrom a desorption zone off-gas containing ammonia, carbon dioxide amd water vapor, and a liquid phase of desorption water substantially free of ammonia and carbon dioxide;
 introducing at least a portion of said desorption zone off-gas into an ammonia separation zone and separately removing therefrom an ammonia off-gas substantially free of carbon dioxide and water, and a residual liquid phase containing ammonia, carbon dioxide and water;

introducing said residual liquid phase from said ammonia separation zone into a carbon dioxide separation zone and separately removing therefrom a carbon dioxide off-gas substantially free of ammonia and water and a residual liquid phase containing ammonia, carbon dioxide and water; and introducing said residual liquid phase from said carbon dioxide separation zone into said desorption zone;

wherein the system pressure in said carbon dioxide separation zone is greater than twice the system pressure in said ammonia separation zone, said improvement comprising introducing into the portion of said ammonia separation zone from which said residual liquid phase is removed, a carbon dioxide containing gaseous phase in an amount sufficient to make said residual liquid phase removed therefrom lean with respect to ammonia.

15. The process of claim 12, 13 or 14 wherein the ratio between the respective system pressures in said ammonia separation zone and in said carbon dioxide separation zone is between about 1:5 and 1:20.

16. The process of claim 12, 13 or 14 wherein diluting water is introduced into said carbon dioxide separation zone.

* * * * *

UNITED STATES PATENT AND TRADEMARK OFFICE
CERTIFICATE OF CORRECTION

PATENT NO. : 4,256,471
DATED : March 17, 1981
INVENTOR(S) : Josephus J. P. M. Goorden It is certified that error appears in the above—identified patent and that said Letters Patent is hereby corrected as shown below:

At col. 14, line 26, the word "depression" should read --desorption--.

At col. 12, line 25, delete "said".

Signed and Sealed this

Sixth Day of October 1981

[SEAL]

Attest:

GERALD J. MOSSINGHOFF

Attesting Officer

Commissioner of Patents and Trademarks